Aug. 9, 1932. B. A. PROCTOR 1,871,237
CONTAINER FOR FILMS AND MEANS FOR HANDLING THE SAME
Filed Jan. 16, 1929
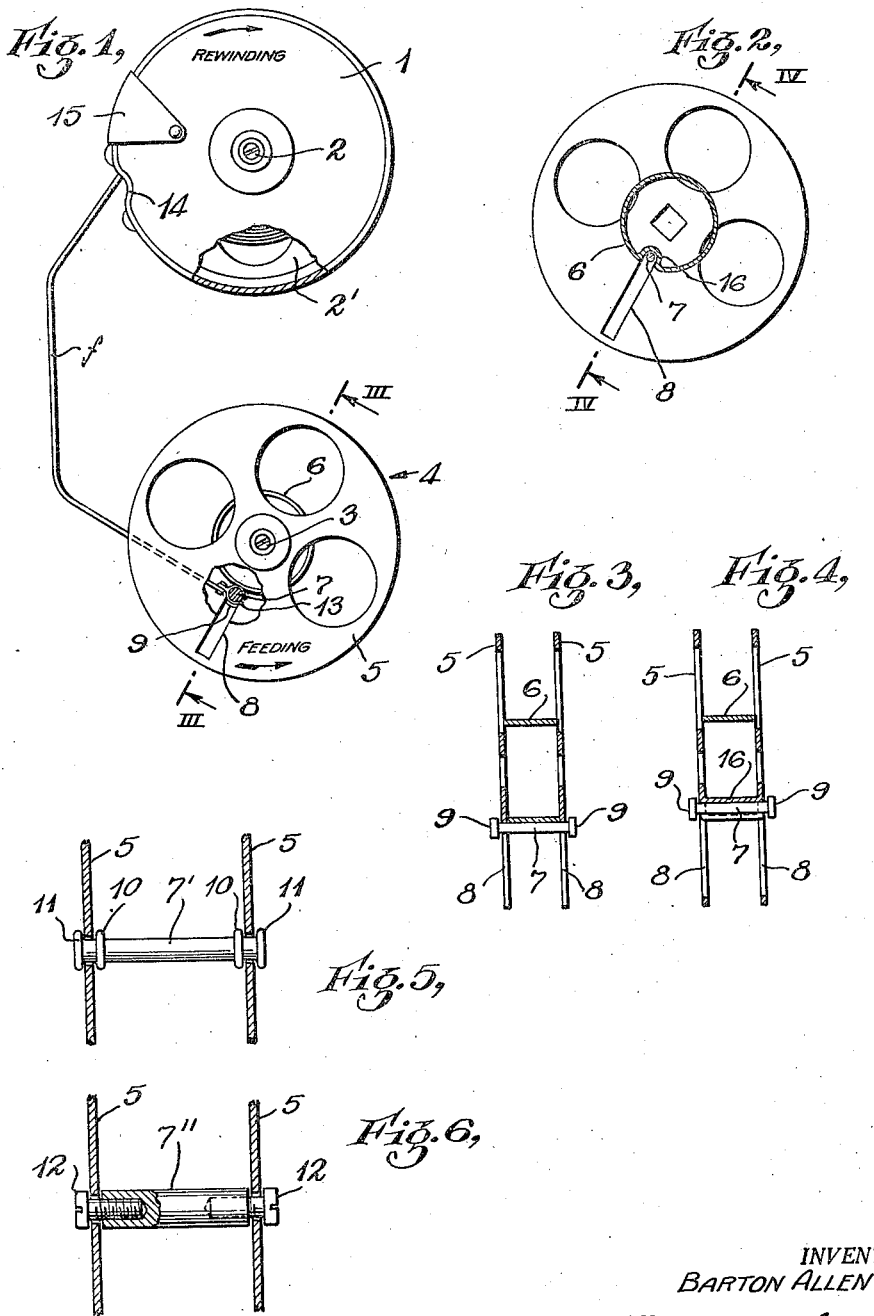
INVENTOR.
BARTON ALLEN PROCTOR
BY Waldo G. Morse
ATTORNEYS.

Patented Aug. 9, 1932

1,871,237

UNITED STATES PATENT OFFICE

BARTON ALLEN PROCTOR, OF PELHAM MANOR, NEW YORK, ASSIGNOR, BY MESNE ASSIGNMENTS, TO KINATOME PATENTS CORPORATION, OF NEW YORK, N. Y., A CORPORATION OF NEW YORK

CONTAINER FOR FILM AND MEANS FOR HANDLING THE SAME

Application filed January 16, 1929. Serial No. 332,884.

My invention can be applied to any art in which material is fed from or to a carrier or a support and is particularly useful in connection with carriers or supports for films, whether for light-sensitive material for cooperation with a camera or sound recording apparatus or for image bearing material for cooperation with a motion picture or stereoptican projector or with a sound reproducing instrument or with an apparatus adapted for the simultaneous reproduction of visual images and sound.

The present application is a continuation in part of my co-pending application Serial Number 54,910, filed September 8, 1925.

In my apparatus such as that shown and claimed in the above mentioned application, I provide means for automatically placing the film in full operative relationship with the film handling instrument and if desired for rewinding it after the projection or exposure cycle without its removal from the instrument. An object of the present invention is to provide a single magazine, of small bulk and little weight which, when placed upon the delivery or rewinding spindle of the film handling apparatus, will facilitate the positioning of the film in complete operative relation therewith and, when detached therefrom, will protect the film during shipment and storage. The present invention discloses means cooperating with such a magazine whereby the film therein may be quickly attached to a take-up reel or support and, during the projecting, reproducing or exposure cycle, be firmly held in place relatively thereto and wound thereupon and, substantially at the conclusion of the rewinding cycle, be automatically detached therefrom.

Still further objects of my invention include the provision of an inexpensively constructed, and easily handled detachable film magazine of a bulk, weight and size only slightly greater than that of the film therein, of a take-up or receiving reel, of which only one per apparatus need be provided, with which the film which is supported and protected by the magazine may be instantly placed into operative relationship and from which it will be automatically detached at the conclusion of rewinding; and of inexpensive and simple connective means between the film and the take-up reel which efficiently cooperates with both the take-up reel and the magazine.

Other objects and characteristics are apparent in the following description, the attached drawing and the subjoined claims. Although I am showing one preferred embodiment of my invention, it will be readily understood that I am not limited to this particular construction as changes can readily be made without departing from the spirit of my invention or the scope of my broader claims.

Figure 1 is a side elevational view showing the single container, the receiving reel, and one preferred method of attaching the film thereto.

Figure 2 is a side elevational view of one preferred form of receiving reel with a slot which terminates in a recess within the hub.

Figure 3 is a section upon the line III—III of Figure 1 showing the pin in position.

Figure 4 is a section upon the line IV—IV of Figure 2 showing the pin in position.

Figures 5 and 6 show preferred constructions of the connecting pin.

In carrying out my invention, I may provide a film magazine 1 adapted to be removably mounted over the end of a supply or delivery spindle 2 of a film handling apparatus, such as for example that described and claimed in my co-pending application Serial Number 54,910, filed September 8, 1925. The film $f$ may be wound upon a reel or other appropriate support, 2' contained within the magazine 1, the inner or so-called trailer end of the film being permanently attached to such support, preferably by a length of heat resisting material as is disclosed in the above mentioned application and in application, Serial Number 332,880, filed concurrently herewith. During the feeding cycle, the spindle 2 may idle, moving in an anti-clockwise direction as viewed in Figure 1 of the drawing. During the rewinding cycle, power may be applied to this spindle to turn the same in a clockwise direction as viewed in Figure 1 of the drawing, whereby the film is rewound upon the inner reel or other appropriate structure contained within the magazine 1.

Upon the take-up or driving spindle 3 of the film handling apparatus, I may mount the receiving reel 4. Such reel may be of any suitable construction, such as that of two side-plates 5 supported in spaced parallelism by a hub 6. I may permanently attach this reel to the take-up spindle or I may construct it so that it can be removably mounted over the end of the spindle. In the latter case, it will be understood that the apparatus will be adapted, when the magazine 1 and the reel 4 are demounted therefrom, to the use of any reel upon which film may be wound by a dealer in films or by one of the so-called film-libraries or film exchanges. In either case, it will be necessary to furnish but one such take-up reel for each apparatus.

During the feeding cycle, the spindle 3 is revolved in an anti-clockwise direction as viewed in Figure 1 of the drawing, thus similarly revolving the reel 4 and winding the film f thereupon. When the film is rewound by the application of power to the rewinding spindle 2, the reel 4 is revolved in a clockwise direction and the spindle 3 idles. Power may be applied to such spindles in any suitable manner, as in the manner shown in my co-pending application referred to.

In order suitably to attach the film to such take-up reel, I may provide the take-up reel with a pin 7 movable in substantially opposite slots 8 in the side plates 5 of the reel 4, but prevented from substantial lateral movement as by the heads 9. The outer or peripheral end of the slots may be closed thus preventing the emergence of the pin therethrough.

The pin 7 may be merely a piece of drill rod or other round stock turned down in the center so as to provide the heads 9 which prevent its movement laterally relative to the side plates of the take-up reel. I have found, however, that if such sides are made of thin sheet metal, as may be desired under certain conditions, and for other reasons, it may be desirable as is clearly shown in Figure 5 of the drawing, to provide a pin 7' having at each end a double head composed of two flat extensions 10 and 11 at right angles to the axis of the pin, one upon each side of the side plates 5 of the reel. Thus the pin is guided relatively to each side of each side plate of the reel, and the possibility of the pin jamming in the slot or being pulled laterally therethrough as it is drawn either inwardly or outwardly relative to the axis of the reel is minimized. Under certain conditions it may be desirable to provide a pin with removable heads. Under such circumstances, as is clearly shown for example, in Figure 6 of the drawing, I may provide a pin 7'' adapted to receive headed screws 12.

To the outer or leader end of the film, I may attach a spring clip 13 in any suitable manner, the jaws of such clip being adapted to slide over and grip the pin 7, 7' or 7''. Prior to placing the projector into operation, the user slips the spring clip over the pin, which he can readily hold in any convenient position by means of the protruding heads thereon. Thereafter as he applies power to rewind the reel, the pin is seated at the inner ends of the slots 8 adjacent the hub 6. It will be readily understood that the peripheral speed of the film at the beginning of the feeding operation before the pin has been sealed in position by the film is relatively slow owing to the small diameter of the film mass. During the feeding cycle, as the reel 4 is wound in an anti-clockwise direction as viewed in Figure 1, the pin 7 is drawn to the inner end of the slot 8 and in effect sealed therein as the reel continues to revolve and the film is wrapped about the hub 6 and over the pin.

At the conclusion of the feeding cycle, the spindle 2 may be revolved in a clockwise direction whereby the film is rewound and coiled about the reel or other appropriate structure within the casing 1. Substantially at the conclusion of the re-winding operation the clip 13 is automatically disengaged from the pin 7, travels through the gate, not shown, of the film handling apparatus, and comes to rest in the recess against the top and bottom of the openings 14 in the container 1, thus preventing the complete disappearance of the film within this container and making it readily accessible to the fingers of the operator when he desires to re-thread it in the apparatus.

It will be understood that at the conclusion of the rewinding operation, the peripheral speed of the film is determined by the relatively large mass of film upon the delivery spindle 2. Thus I have found it entirely practicable so to choose the magnitude of the spring 13 so that it is ample to hold the clip and hence the film securely attached to the pin during the beginning of the feeding cycle but to permit its ready withdrawal therefrom substantially at the conclusion of the re-winding cycle at which time the pull of the film owing to its greatly increased speed is relatively high.

I may provide a cover 15 which is adapted to be moved into position to protect the film during shipment or storage.

It will be readily understood by those skilled in the art that my provision of a shield for the sprocket which moves the film to project the same, as disclosed and claimed in my co-pending application set forth, and of means whereby this shield is in protective position during film threading and film rewinding. is particularly important since it protects the teeth of the sprocket from injury from the clip and since it protects the film from injury from the teeth of the sprocket. Also my provision of a yielding drive for the supply spindle disclosed therein and in my co-pending application Serial Number 332,880, filed concurrently herewith, is likewise important because it prevents undue strain upon the film as the pin comes to rest at the conclusion of the re-winding operation.

In order to seat the pin 7, 7' or 7" more securely in the hub 6 and to prevent the irregular or uneven coiling of the film about the hub as is clearly shown in Figure 2 of the drawing, I may provide the slot 8 with a terminal recess 16 lying within the area of the hub 6. As the reel is revolved in an anti-clockwise direction the pin will be drawn to the bottom of this recess and the film will be coiled about the hub without any hump or protuberance caused by the pin. This recess 16 may readily be formed as the hub 6 is stamped from sheet metal.

It will be readily understood that a compact and simple container such as I describe, together with means for readily attaching one end of the film carried thereby to a feeding mechanism and its ready and automatic detachment therefrom, is particularly applicable to that type of film feeding apparatus which produces both pictures and sound, or in a so-called film playing phonograph which produces sound alone. In both such cases the complete protection of the film and its storage in small bulk are important factors. It will be readily understood, also, that my invention is applicable to a camera for the making of so-called motion pictures or a succession of still pictures. In order to prevent so-called edge-fog, it has been proposed to supply motion picture negative in a single light-tight container from which it is fed during exposure and into which it is rewound after exposure. It will be readily understood that my invention provides a container and means of attachment particularly well adapted for such use. By any of several well-known means a light-trap may be provided adjacent the orifice 14 of the container. As an additional precaution in case a paper leader is used, as is now common in the art in spite of the many difficulties in which it results, or in case no leader is used and the length of the film between the clip 13 and the opening 14 is deliberately fogged during the threading process, the cover 15 may be made light tight.

Certain of the advantages of my invention have been stated in the above portion of this specification. Other advantages include the provision of a small, compact inexpensive film container and means cooperating therewith whereby the film within said container may be readily threaded into full operative relation with a film handling apparatus and be automatically rewound from such relation and coiled within the container at the conclusion of the rewinding operation.

I claim:
1. Film handling mechanism, including a carrier to which one end of the film is secured, a second carrier, and means for detachably connecting the free end of the film to said second carrier, said means including a pin, a mounting upon said carrier for said pin so constructed and arranged that said pin is freely movable therewithin and movable relatively to said carrier in a direction from or toward the axis thereof, and a spring clip secured to said film and constructed for cooperation with said pin whereby said film may be detachably connected to said second carrier.

2. For use in a film handling mechanism, a detachable carrier to which one end of the film is secured, a second carrier including a slot therein, a pin freely movable in said slot longitudinally thereof, and a member affixed to the film constructed to cooperate with said pin for detachably connecting the film and said second carrier.

3. For use in a film handling mechanism, a detachable carrier to which one end of a film is secured, a second carrier including a slot therein, a pin freely movable in said slot longitudinally thereof, and a spring clip affixed to the film and adapted detachably to connect the free end of the film to said pin.

4. For use in a film handling mechanism, a detachable carrier to which one end of a film is secured, a second carrier including a radial slot therein, a pin freely movable in said slot longitudinally thereof, and a member affixed to the film and adapted for detachably connecting the free end of the film to said pin.

5. For use in a film handling mechanism, a detachable carrier to which one end of the film is secured, a second carrier comprising a hub and side plates supported thereby, substantially opposite slots in said side plates, said slots extending from said hub toward the periphery of said plates, said slots being closed at the peripheral ends thereof, a pin constructed and arranged for free longitudinal movement within said slots, means to maintain said pin against substantial movement in any direction lateral to said slot whereby said pin is permanently mounted for longitudinal movement within said slot, and a member for detachably connecting the free end of the film to said pin.

6. For use in a film handling mechanism, a detachable carrier to which one end of a film is secured; a second carrier comprising a hub and side plates supported thereby, substantially opposite slots in said side plates extending from said hub toward the periphery of said plates, said slots being closed near the peripheral ends thereof, and a pin longitudinally movable within said slots, said pin being provided with heads at each end thereof constructed to maintain said pin within said slots and to permit free longitudinal movement therewithin; and means for detachably connecting the free end of said film to said pin, such means including a member mounted upon such free end of the film.

7. For use in a film handling mechanism, a detachable carrier to which one end of a film is secured; a second carrier comprising a hub and side plates supported thereby, substantially opposite slots in said side plates, said slots extending from said hub toward the periphery of said plates, said slots being closed at the peripheral ends thereof, a pin constructed and arranged to be freely movable longitudinally of said slots therewithin during the rotation of said second carrier; and a spring clip for detachably connecting the free end of said film to said pin.

8. As an article of manufacture, a cylindrical film carrier comprising a hub, side plates supported thereby, substantially opposite slots in said side plates extending from said hub toward the circumference of said plates, closure for said slots near the outer ends thereof, and a pin mounted within said slots for movement therewithin in a direction longitudinal thereto only, said pin being headed at each end and formed for free movement within said slots longitudinally thereof whereby the movement of said pin laterally to said slots is restricted and longitudinally thereof is free.

9. As an article of manufacture, a carrier comprising a hub and side plates supported thereby, substantially opposite slots in said side plates extending from said hub toward the periphery of said plates, said slots being closed near the peripheral ends thereof, a pin mounted within said slots and adapted to longitudinal movement therewithin, said pin including a substantially cylindrical body, said body being constructed with an annular groove upon each end thereof, each of such grooves being disposed in a plane normal to the axis of the pin, the shoulder formed by each side of each of such grooves being arranged to cooperate with each of the sides of each of said plates respectively to maintain the pin against movement out of such slots in a direction lateral thereto and to permit the free movement of said pin in a direction from or toward the axis of said hub.

10. As an article of manufacture, a carrier comprising a hub and side plates supported thereby, substantially opposite slots in said side plates extending from said hub toward the periphery of said plates, said slots being closed near the peripheral ends thereof, a pin mounted within said slots and adapted to longitudinal movement therewithin, said pin being formed with a head upon each end thereof adapted to engage the outer side of each of said plates and said pin being formed with a shoulder adjacent each of said heads and so disposed in relation thereto as to engage the inner side of each of said plates, said heads and said shoulders being so constructed and arranged that the disposition of said pin in a position other than one substantially parallel to the axis of said carrier is prevented.

11. For use in a film handling mechanism, a carrier to which one end of a film is secured, a second carrier, a pin supported by said second carrier and movable relatively thereto, and means for attaching the film to said pin, said means being effective to maintain the film in relation with said second carrier when said second carrier is rotated at one speed and ineffective to maintain the film in relation to said second carrier when said second carrier is rotated at another predetermined speed materially greater than said first speed.

12. In a film handling mechanism including a carrier to which one end of a film is secured, a second carrier, a pin supported by said second carrier and movable relatively thereto, and means for detachably connecting the free end of the film to said pin, said means including a spring of a magnitude greater than that of the traction of said pin when said second carrier is revolved at a predetermined speed and less than that of the traction of said film when said film is moved a second predetermined speed materially greater than said first mentioned speed.

Signed at New York city, in the county of New York and State of New York, this 28th day of December, A. D., 1928.

BARTON ALLEN PROCTOR.